C. L. DESMOND.
FISHING TACKLE.
APPLICATION FILED MAR. 30, 1909.
953,125.
Patented Mar. 29, 1910.
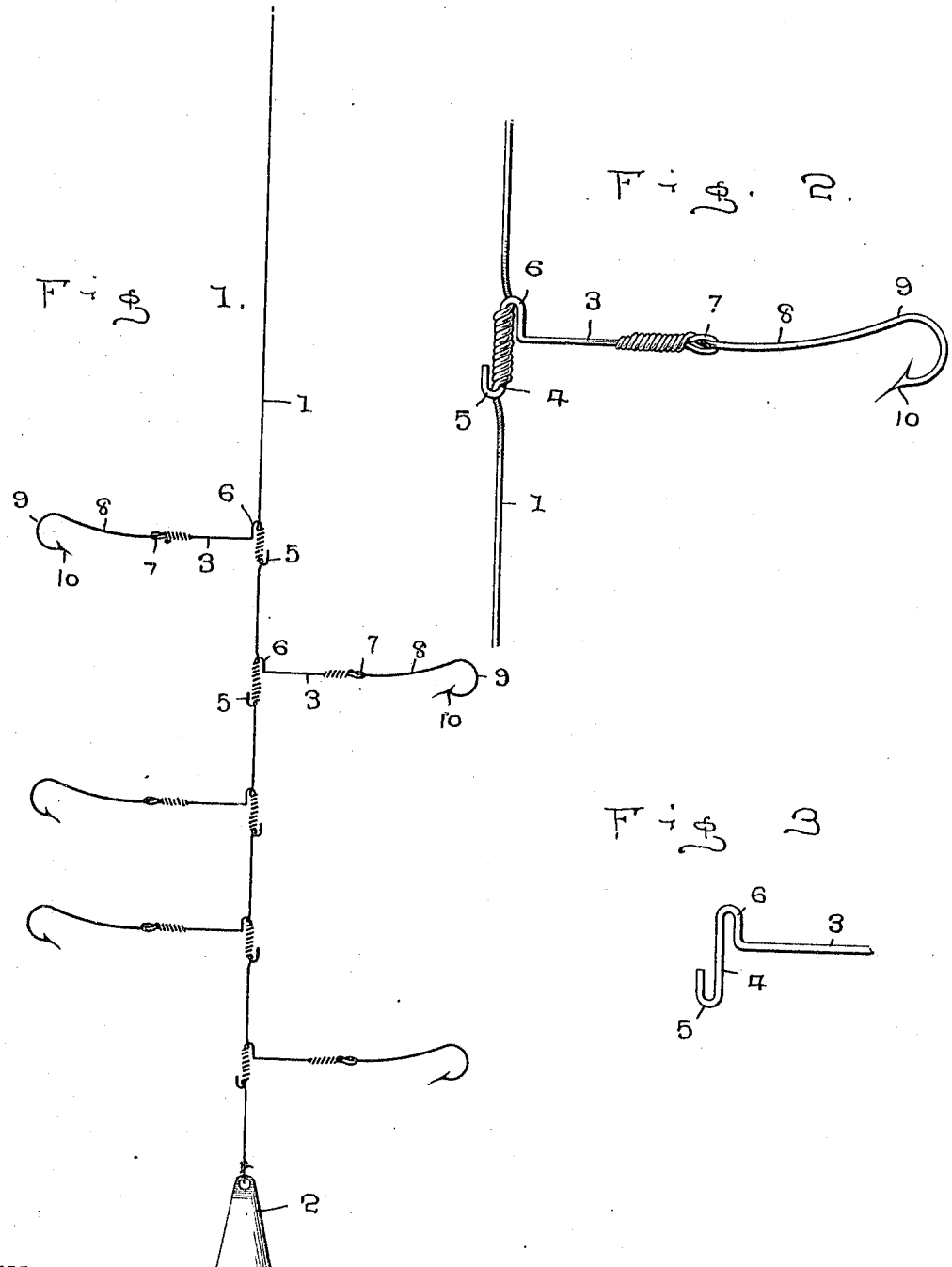
WITNESSES:
INVENTOR
C. L. Desmond
BY
W. J. Fitzgerald & Co
Attorneys

UNITED STATES PATENT OFFICE.

CORNELIUS LEO DESMOND, OF SAN FRANCISCO, CALIFORNIA.

FISHING-TACKLE.

953,125.  Specification of Letters Patent.  Patented Mar. 29, 1910.

Application filed March 30, 1909. Serial No. 486,668.

*To all whom it may concern:*

Be it known that I, CORNELIUS L. DESMOND, a citizen of the United States, residing at San Francisco, in the county of San Francisco and State of California, have invented certain new and useful Improvements in Fishing-Tackle; and I do hereby declare the following to be a full, clear, and exact description of the invention, such as will enable others skilled in the art to which it appertains to make and use the same.

My invention relates to new and useful improvements in fishing tackle and my object is to provide means for removably attaching a plurality of hook retaining members to a line.

A further object is to provide for retaining the hooks below the water surface and a further object is to provide means for attaching the hooks to the hook-retaining members.

Other objects and advantages will be hereinafter referred to and more particularly pointed out in the claim.

In the accompanying drawings forming part of this application, Figure 1 shows a line with a plurality of hooks attached thereto and a weight for retaining the hooks below the water surface. Fig. 2 is an elevation on an enlarged scale of a portion of the line and means for attaching the hook thereto, and, Fig. 3 is a detail elevation of a portion of the hook retaining member the terminal eye thereof being omitted.

Referring to the drawings in which similar reference numerals designate corresponding parts throughout the several views, 1 indicates a line such as is commonly used for fishing purposes, to one end of which is secured a weight 2, which weight is adapted to retain a portion of the line below the surface of the water.

Attached at intervals to the weighted end of the line 1 are hook retaining members 3, one end of said member being formed substantially S-shaped as best shown in Fig. 3, the vertical stem 4 of the end section terminating in an upwardly extending hook 5 at its lower end and a downwardly extending hook 6 at its upper end, the hook portion 6 forming the connection between the vertical stem 4 and the main portion of the retaining member 3.

In removably attaching the member 3 to the line, a portion of the line is wound around the stem 4 until the stem is substantially wrapped its full length, the depending portion of the line extending at one side of the hook 5, while the upwardly extending portion extends to the opposite side of the hook 6, thereby preventing the line from unwinding from the stem 4, at the same time preventing the casual movement of the stem 4 longitudinally of the line.

The retaining member 3 is preferably formed of wire and has at its outer end an eye 7, through which extends the stem 8 of a hook 9, the inner end of the stem after being introduced through the eye 7, being wound around the main portion of the retaining member 3, thereby securely attaching the hook to the retaining member.

The hook 9 may be constructed in the usual or any preferred manner and provided with a bar 10 at its free end, which is so arranged as to engage the mouth of the fish and impale the same thereon. In this manner a number of the retaining members may be very quickly attached to or removed from the line 1 and the hooks may be readily removed when broken or when it is desired to apply hooks of various dimensions and strength and by holding the line 1 taut, the retaining members and hooks will be held substantially at right angles to the trend of the line.

What I claim is—

In a fishing tackle, the combination with a line, fishing hooks and retaining members each retaining member having an S-shaped outline, comprising a vertical stem terminating in an upwardly extending hook at its lower end and a downwardly extending hook at its upper end, one of said hooks having a lateral extension terminating in an eye, adapted to aid in the attachment thereto of a fishing hook.

In testimony whereof I have signed my name to this specification in the presence of two subscribing witnesses.

CORNELIUS LEO DESMOND.

Witnesses:
JAMES L. NAGLE,
P. B. NAGLE.